United States Patent
Bening et al.

(10) Patent No.: US 6,509,072 B2
(45) Date of Patent: Jan. 21, 2003

(54) MULTI-LAYER FILM WITH PERIODIC BARRIER COATING AND METHODS OF MAKING AND USING SUCH FILM

(76) Inventors: P. Scott Bening, 8449 Pine Island Dr., Crown Point, IN (US) 46307; Andrew P. Verrall, 925 S. East St., Crown Point, IN (US) 46307; Christian Jouffreau, 5 Impasse des Castors, 77140 Nemours (FR)

(*) Notice: Subject to any disclaimer, the term of this patent is extended or adjusted under 35 U.S.C. 154(b) by 0 days.

(21) Appl. No.: 09/300,552

(22) Filed: Apr. 27, 1999

(65) Prior Publication Data
US 2002/0006485 A1 Jan. 17, 2002

(51) Int. Cl.[7] .............................. B32B 1/04; B32B 1/06
(52) U.S. Cl. .................... 428/35.4; 428/36.6; 428/78; 428/192; 428/194; 428/520; 428/522; 428/532; 53/51; 53/53; 53/459
(58) Field of Search ............................ 428/36.6, 35.4, 428/78, 195, 200, 213, 520, 522, 532, 194, 192; 427/259; 53/477, 455, 459, 51, 53; 206/524.1

(56) References Cited

U.S. PATENT DOCUMENTS

| | | | | |
|---|---|---|---|---|
| 3,186,869 A | * | 6/1965 | Friedman | 206/524.7 |
| 3,790,067 A | * | 2/1974 | Scheier | 383/1 |
| 4,353,196 A | * | 10/1982 | Beer et al. | 53/451 |
| 5,108,807 A | | 4/1992 | Tucker | 428/35.2 |
| 5,139,152 A | | 8/1992 | Hodakowski et al. | 206/524.7 |
| 5,158,810 A | | 10/1992 | Oishi et al. | 428/35.4 |
| 5,222,595 A | | 6/1993 | Gouge et al. | 206/205 |
| 5,224,601 A | | 7/1993 | Gouge et al. | 206/524.7 |
| 5,248,038 A | | 9/1993 | Hodakowski et al. | 206/524.7 |
| 5,253,759 A | | 10/1993 | Gouge et al. | 206/524.7 |
| 5,279,421 A | | 1/1994 | Gouge et al. | 206/484 |
| 5,280,835 A | | 1/1994 | Edwards et al. | 206/484 |
| 5,283,090 A | | 2/1994 | Umemura | 428/35.4 |
| 5,296,282 A | | 3/1994 | Evers | 428/195 |
| 5,300,358 A | | 4/1994 | Evers | 428/286 |
| 5,323,906 A | | 6/1994 | Gouge et al. | 206/524.7 |
| 5,328,025 A | | 7/1994 | Hodakowski et al. | 206/205 |
| 5,330,047 A | | 7/1994 | Gouge et al. | 206/205 |
| 5,341,932 A | | 8/1994 | Chen et al. | 206/524.7 |
| 5,346,068 A | | 9/1994 | Gouge et al. | 206/524.7 |
| 5,351,831 A | | 10/1994 | Gouge et al. | 206/524.7 |
| 5,394,990 A | | 3/1995 | Edwards et al. | 206/524.7 |
| 5,429,242 A | | 7/1995 | Edwards et al. | 206/484 |
| 5,429,874 A | * | 7/1995 | VanPutte | 428/35.2 |
| 5,464,097 A | | 11/1995 | Edwards et al. | 206/524.7 |
| 5,468,526 A | | 11/1995 | Allen et al. | 428/35.4 |
| 5,558,228 A | | 9/1996 | Jackisch et al. | 206/524.7 |
| 5,624,034 A | | 4/1997 | Edwards et al. | 206/484 |
| 5,674,578 A | * | 10/1997 | Giori | 428/216 |
| 5,691,015 A | | 11/1997 | Tsukamoto et al. | 428/35.2 |
| 5,827,586 A | * | 10/1998 | Yamashita et al. | 428/36.6 |
| 6,021,629 A | * | 2/2000 | Sterner, Sr. | 53/471 |

\* cited by examiner

Primary Examiner—D. Lawrence Tarazano

(57) ABSTRACT

A multi-layer film includes a structural layer of water-soluble film, and a barrier layer. The barrier layer is affixed to spaced apart discrete areas of the structural layer. The barrier layer has insufficient structural integrity and strength to contain a bag's contents once the structural layer has been dissolved. A bag is formed by overlapping areas of the multi-layer film which do not include the barrier layer, and sealing the overlapping areas to one another.

38 Claims, 4 Drawing Sheets

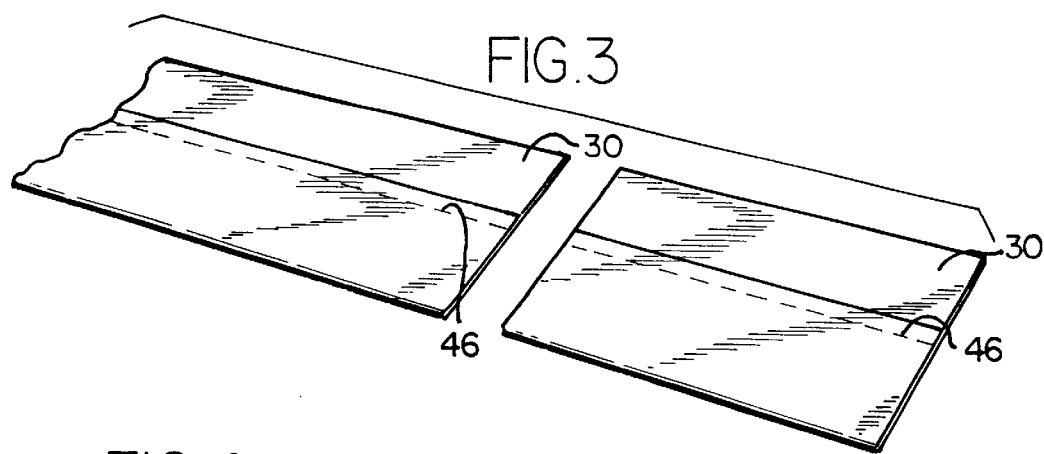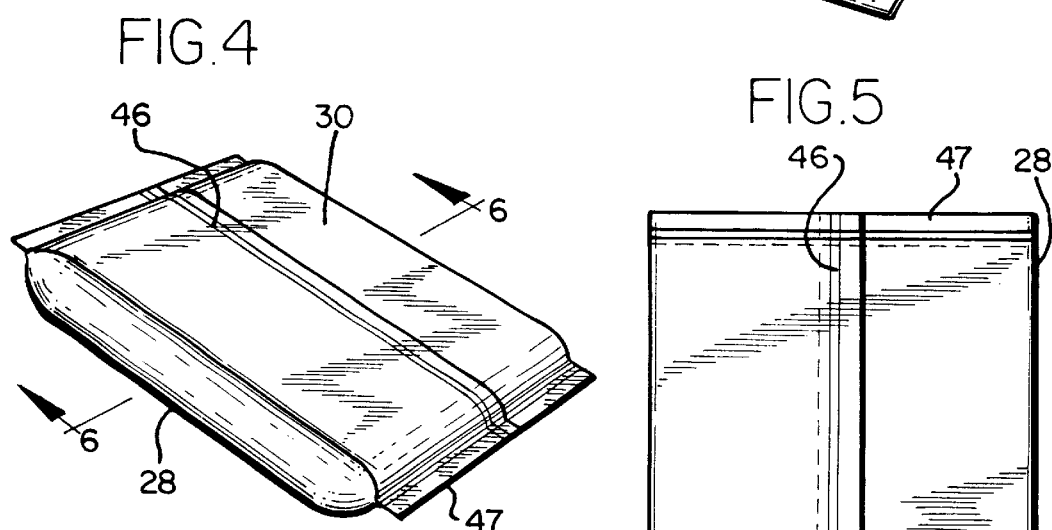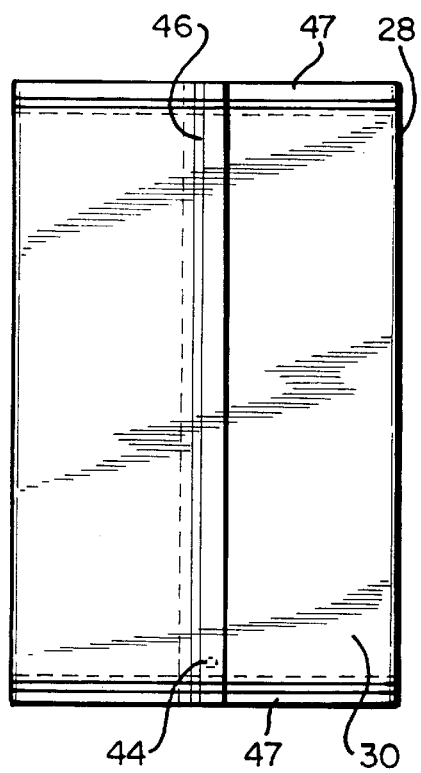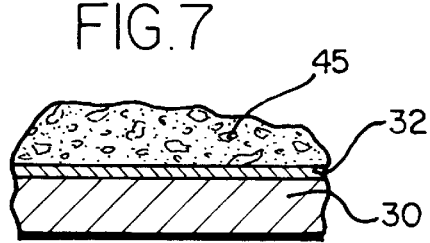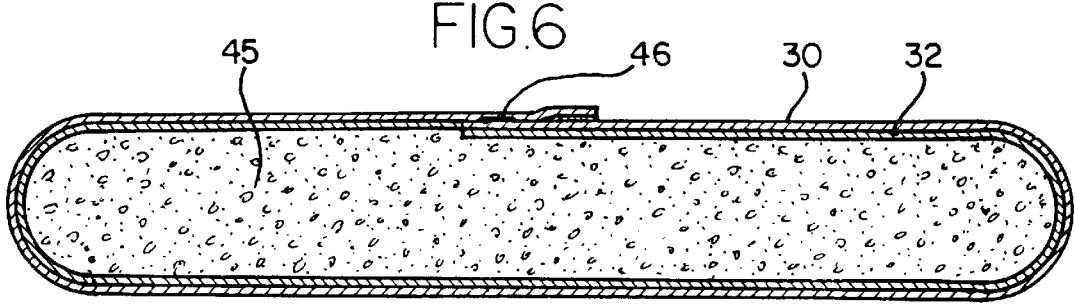

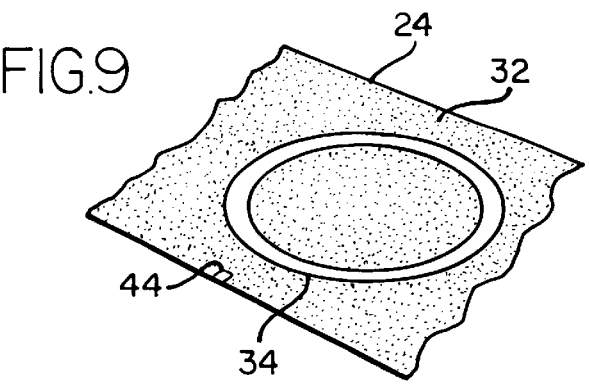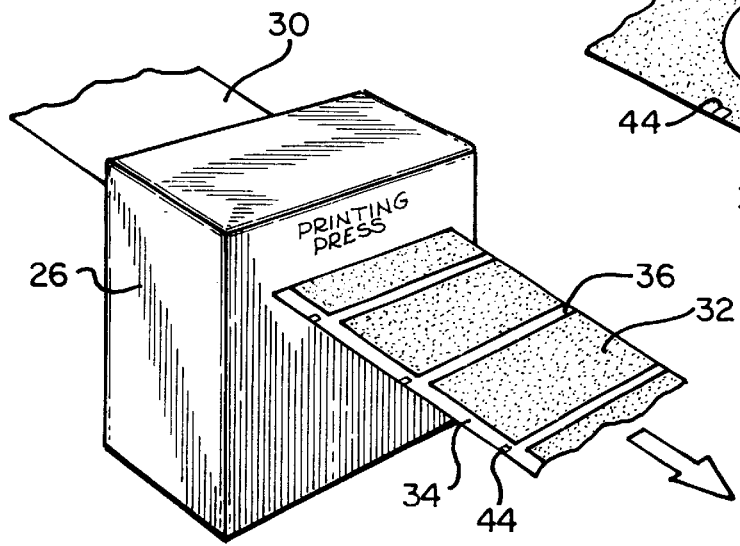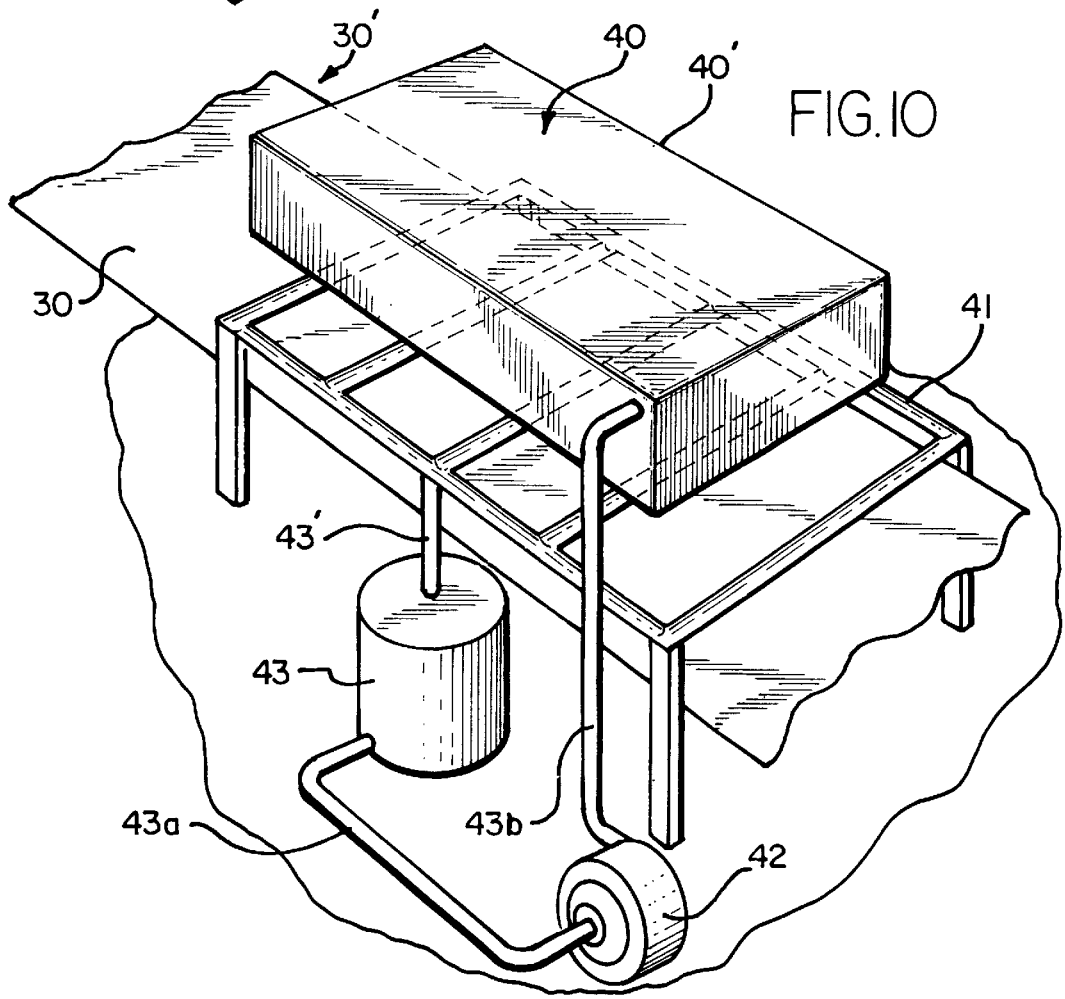

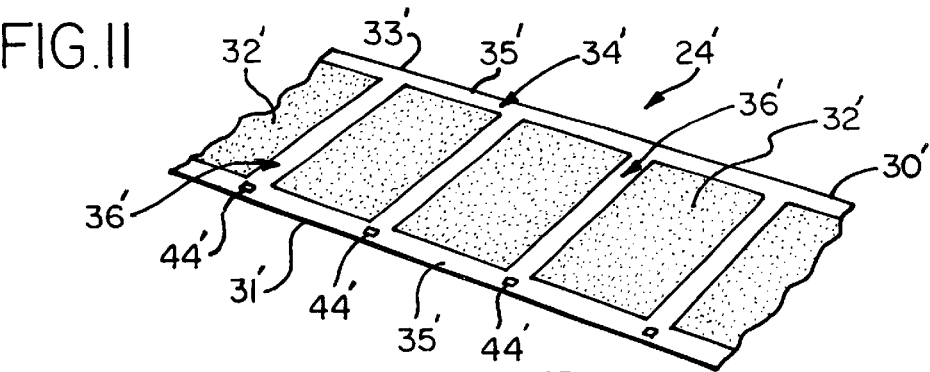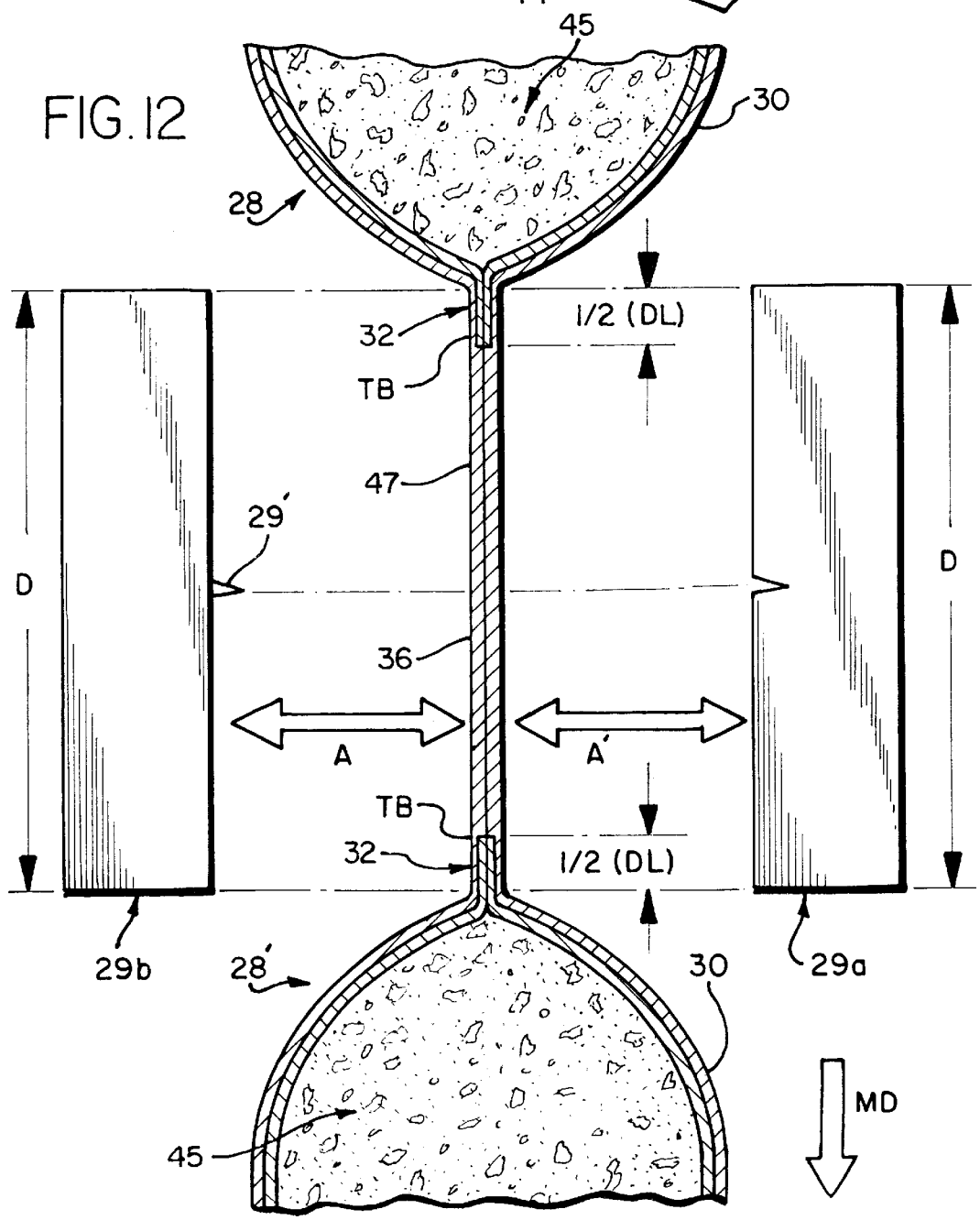

MULTI-LAYER FILM WITH PERIODIC BARRIER COATING AND METHODS OF MAKING AND USING SUCH FILM

FIELD OF THE INVENTION

The invention relates to a multi-layer, water-soluble or dispersible film having a periodic barrier coating suitable for forming into a container, a method of making such film, a method of packaging a substance in such film, and a container comprising such film. More particularly, the present invention relates to a multi-layer, water-soluble or dispersible film having a continuous water-soluble layer, a barrier coating applied intermittently to discrete areas of the continuous layer, leaving a plurality of uncoated intervals on the continuous layer where the film can be formed into a bag for holding substances that adversely affect the continuous layer of the bag and where the barrier coating is less susceptible or reactive with the substance to be packaged than the continuous layer. The invention also relates, in particular, to a method of making the water-soluble film comprising applying a barrier coating to discrete areas of a continuous water-soluble layer so as to leave a plurality of uncoated intervals on the continuous layer. The invention also relates, in particular, to a method of packaging a substance, where the method comprises forming the afore-described multi-layer, water-soluble film into a container, filling the container, and sealing the container, such that the barrier coating forms the inner surface of the container where it prevents the packaged substance from contacting the outer continuous layer, which is more reactive with the packaged substance.

BACKGROUND OF THE INVENTION

Various types of materials, including non-toxic and potentially hazardous or toxic compounds can be sold in a concentrated form to be dispersed in water or other organic material prior to use. These compounds include, for example, agrichemicals such as herbicides, pesticides, fungicides, insecticides, and fertilizers. Containers are needed for conveniently and safely distributing, selling, and utilizing such materials.

One such container that offers numerous commercial advantages for the packaging of potentially harmful materials is a water-soluble or dispersible container—e.g., a bag, pouch, package, or related enclosure formed from film. First, via its seal, a water-soluble bag protects the user from accidentally ingesting or otherwise contacting the contents of the package. Second, the precisely measured quantities of the chemical in the bag prevent waste through over charging and minimize accidents. Finally, as the bag dissolves completely in water and the solubilized bag material is biodegradable, there is no potentially hazardous or environmentally destructive packaging material to be discarded.

A variety of cold water-soluble films can be used for the purpose of packaging potentially harmful compounds. A polymeric barrier coating can be affixed to the water-soluble film to minimize or prevent the active material being packaged from chemically or physically interacting with the film surface. When applied onto the water-soluble film, the barrier coating minimizes changes in the properties of the film, protects the activity of the packaged material over the storage life of the package, and provides satisfactory solubility of the film.

One potential problem, however, that could be encountered with multi-layer, water-soluble films is that the presence of continuous coating in the seal-forming area impairs the ability of the film to be heat-sealed. As a result, heat seals formed between two continuous layers of barrier coating are generally weak, peelable, or nonexistent.

Other attempts to address this problem have included the development of a three-layer packaging film comprising a first layer of cold water-soluble film, a second layer of barrier material, and a third layer of cold water-soluble film for forming the heat seal. Use of this film for packaging, however, may present the following concerns: (1) whether the heat-seal layer would insufficiently disperse under various conditions; (2) whether the bond between the third (heat-sealing) layer and the second (barrier) layer would be maintained after sealing; (3) whether a three-layer film is economically feasible; and (4) whether a three-layer film will dissolve in a timely manner.

Consequently, there exists a need for a water-soluble or water-dispersible, multi-layer film that can be used to produce a well-sealed package for materials that adversely affect one or more layers of the film, particularly the layer that forms the outer portion of the package. There also exists a need for a method for making such film and a method of packaging substances in such film.

SUMMARY OF THE INVENTION

In accordance with one aspect of the present invention, a multi-layer, cold water-soluble or dispersible film is provided. The multi-layer film comprises: (1) a continuous, cold water-soluble or dispersible material suitable for forming an outer layer of a bag for containing a material therein and having sufficient thickness and strength for use as the bag for containing the material, which may be a solid or a liquid; and (2) a discontinuous barrier coating, suitable for forming an inner layer of a bag, affixed to discrete areas of the continuous layer with areas of the continuous layer being uncoated by the barrier layer. The barrier coating is termed "discontinuous" because it does not cover at least those areas of the continuous layer that will be formed into a seal or seals when formed into a package or bag. However, the barrier coating is preferably a continuous coating where it is intended to be present since generally its function is to protect the continuous layer from contact with the material contained within the bag or container when the continuous layer forms the outer layer (or at least not the inner layer) of the bag. The discontinuous barrier coating is less reactive than the continuous coating with respect to the substance or material to be packaged, whether a liquid or a solid. Generally, the barrier layer or coating also lacks sufficient structural integrity and strength to contain the contents of the bag once the outer layer is dissolved or dispersed. Thus, the barrier layer is not a structural layer.

In one embodiment, the discontinuity of the barrier coating defines a plurality of uncoated areas, including areas occurring at repeating distances on the continuous layer, which define the seal-forming areas when the film is constructed into a bag. The uncoated area should correspond at least to the areas which will form the bag seal, which may depend on the particular sealing machine that may be utilized. Typically, the outer layer of the bag should have sufficient strength to contain liquids of a specific gravity of about one or more and in a bag volume that contains up to about eight fluid ounces or more, for example, such as up to about two liters.

For example, in accordance with one aspect of the present invention, the uncoated areas may occur along at least one longitudinal end of the continuous layer and at repeating distances spaced apart longitudinally at transverse locations across the continuous layer and are especially useful for a vertical form, fill and seal packaging equipment.

Preferably, the multi-layer, water-soluble film has indicia means for identifying the locations of uncoated areas so as to form the seal-forming areas when the film is used to construct the bag.

The invention is particularly useful for containing materials, whether solid or liquid that attack or degrade or adversely affect the continuous layer.

As used herein, the term "chemical" includes all types of chemicals, including potentially hazardous chemical materials, including organic chemicals such as, but not limited to, agrichemicals, detergents, dyes, pigments, water treatment chemicals and additives, including for concrete, paint and coatings, for example. The term "agrichemicals" includes, for example, agronomically useful chemicals from the following classes: plant nutrients, plant growth regulators, plant protection agents such as pesticides (e.g., herbicides, insecticides, nematocides, fungicides), activity promoters, penetrating agents, synergists, antidotes and safeners, activators, compatibility agents, and adjuvants. The term "agrichemicals" also includes agrichemical compositions (mixtures of one or more agrichemicals with any conventional agronomically acceptable carrier or diluent). The multi-layer film of the present invention can be used to make water-soluble or dispersible packages that are suitable for containing chemicals such as agrichemicals or agrichemical compositions in the form of liquids, solids, or gels. Suitable liquids are, for example, in the form of dispersions, solutions, suspensions, emulsions, and colloids. Solids are in the form of powders, granules, and prills, for example.

The term "cold water" means liquid at a temperature of less than 50° C., preferably lower than 35° C.; for example, between 5° C. and 35° C. "Cold water soluble" means completely soluble in cold water. "Dispersible" means that the component disintegrates or dissipates into fine particles. For example, particles having a mean particle size of from about 0.1 to about 25 microns, as measured by the CIPAC MT 176 test for dissolution capacity of water soluble-sachets, are considered to be dispersible for the purpose of the present invention. Preferably, for agrichemical use, the dispersed particles are small enough to pass through the orifice of a conventional agrichemical spray apparatus or are filterable without plugging the spray orifice or filter of a conventional agrichemical sprayer.

The term "substantially adversely affect" in the context of contact with the cold water-soluble film by the material desired to be contained, whether an agrichemical material or other chemical material, means that the material is not suitable for containment in a package made of the film because of a deleterious effect—whether a chemical or physical reaction—resulting from contact of the material with the film; including, for example, the material causing the film to dissolve or causing the film components to leach into the material. In addition, the material stored in the package can affect the film, for example, by altering the properties of the film such as by extracting a plasticizer which makes the film brittle or by making the film insoluble or otherwise unsuitable for use in packaging the material.

Typically, the continuous, cold water-soluble layer is much thicker than the barrier coating. Usually, the thickness ratio of the continuous layer to the barrier coating is from about 500:1 to about 2:1, preferably from about 400:1 to about 3:1 and more preferably 60:1 to 5:1. When the multi-layer, cold water-soluble or dispersible film of the invention is used to form a bag and the continuous, water-soluble layer dissolves, the barrier coating releases the chemical in the bag by dissolving or dispersing. Generally, because the barrier coating is thinner than the continuous layer, when the film is formed into a bag, the barrier layer lacks sufficient structural integrity to remain intact after the continuous layer has dissolved or dispersed.

The continuous, cold water-soluble layer can comprise any suitable water soluble material, including but not limited to materials selected from the group consisting of polyvinyl alcohol, polyoxyethylene cellulose derivatives and other materials as hereinafter described, or a combination thereof.

The discontinuous barrier coating can be dispersible or soluble in hot or cold water. To function properly as a "barrier," this layer should be less susceptible than the continuous layer to interaction with the agrichemical or other material to be packaged.

In accordance with another aspect of the present invention, a water-soluble or dispersible bag is provided for containing various types of materials, the bag being particularly suitable for containing materials, including agrichemicals, that substantially adversely affect cold water-soluble film. The bag is composed of the aforedescribed, inventive film comprising a continuous structural layer of cold water-soluble material and a discontinuous barrier layer affixed to the continuous layer, leaving a plurality of uncoated areas of the continuous layer including at least the areas which will be used to seal the film into a bag or container. For example, for a vertical form, fill and seal device, uncoated areas are located along at least one longitudinal edge of the continuous layer and at repeating distances in transverse locations across the continuous layer or as otherwise required for a specific packaging machine system. The uncoated areas of continuous film form the sealing areas when the film is constructed into the bag. The continuous layer of cold water-soluble film forms the outer layer of the bag, and the barrier layer forms the inner layer of the bag. The continuous layer has sufficient thickness and strength for use as a bag. The barrier coating, which is less susceptible than the continuous layer to interaction with the composition to be packaged, is capable of preventing or mitigating the packaged material from contacting the continuous, cold water-soluble film layer. The barrier coating lacks sufficient structural integrity to contain the chemical in the bag once the water-soluble film layer is substantially dissolved or dispersed. When the bag is placed in water and the water-soluble layer dissolves, the barrier coating dissolves or disperses into particles small enough to disperse or dissolve into the water without clogging the spray system and the material that was contained in the bag is released.

In accordance with one aspect of the invention, the bag is sealed with a material contained therein, which may be a solid or a liquid, for example.

In accordance with still another aspect of the present invention, a method is provided for making a water-soluble film suitable for subsequent construction or fabrication into a bag to contain a chemical that adversely affects the water-soluble film. The method includes intermittently applying a layer of barrier coating onto discrete areas of a continuous layer of water-soluble material, leaving a plurality of uncoated areas on the continuous layer and forming the multi-layer film in accordance with the invention.

In accordance with still another aspect of the present invention, a method is provided for packaging a substance that chemically or physically reacts with a water-soluble film. The method includes forming a water-soluble container—such as a package, bag, pouch or other container—from the aforedescribed multi-layer film, by any suitable method and apparatus, where the continuous layer of water-soluble material forms the exterior of the bag and the intermittently applied barrier coating forms the interior of the bag. The method also includes filling the package with a desired amount of the substance to be packaged, and sealing the film together along at least one uncoated interval to form the sealed package so that the inner barrier coating prevents the packaged substance from contacting the outer water-soluble layer.

BRIEF DESCRIPTION OF THE DRAWINGS

Other advantages and features of the invention will become apparent from the following description and from reference to the drawings.

FIG. 2A shows a barrier coating being intermittently affixed to discrete areas of a continuous layer of water-soluble film so that a repeating plurality of uncoated areas remains on the continuous layer.

FIG. 3 is a perspective view of the water-soluble film joined along its longitudinal edges and cut transversely to form a single-sealed web ready to form into a bag.

FIG. 4 is a perspective view of a filled and sealed bag formed from the water-soluble film.

FIG. 5 is a perspective view of a bag formed from the water-soluble film, showing the seals along the transverse uncoated intervals and the longitudinal seal and a registration mark on the lower longitudinal seal.

FIG. 6 is a cross-sectional view, taken along line 6—6 of FIG. 4, of a filled and sealed bag formed from a water-soluble film in accordance with another aspect of the present invention.

FIG. 7 is a fragmentary enlarged view of the multi-layer, water-soluble film used to construct the bag shown in FIG. 6, showing the thicker, continuous water-soluble layer forming the exterior layer and the thinner barrier coating forming the interior layer of the bag.

FIG. 8 is a schematic showing an apparatus that utilizes a printing operation to affix the barrier coating and preferably a registration mark onto a web of continuous film.

FIG. 9 is a perspective view of an alternative embodiment of the water-soluble film, wherein the uncoated intervals of the continuous layer occur in a circular configuration.

FIG. 10 is a schematic illustration showing an apparatus for making the multi-layer, water-soluble film.

FIG. 11 is a perspective view of another embodiment of a film in accordance with the present invention.

FIG. 12 is a schematic illustration showing a useful apparatus for forming a heat seal in accordance with the invention.

DETAILED DESCRIPTION OF THE INVENTION

Figure 1:
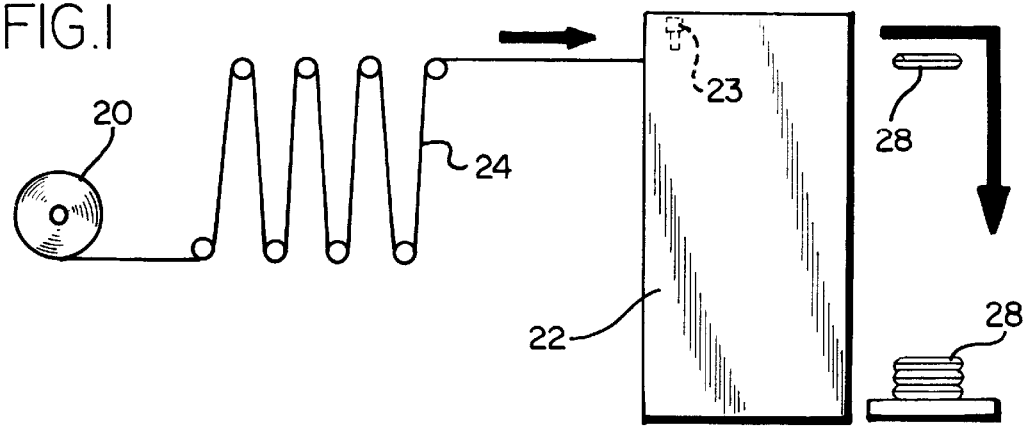
FIG. 1 is a schematic of a process for making a water-soluble package comprising a continuous layer of water-soluble film and a barrier coating intermittently applied to discrete areas of the film.

FIG. 1 illustrates a process for making a water-soluble package from a multi-layer, water-soluble film 24 comprising a continuous layer 30 of water-soluble material and a non-structural barrier coating layer 32 intermittently applied to discrete areas of the film, leaving uncoated area 34 which will be used to form seal areas when formed into a sealed bag or container as hereinafter described. Generally, barrier coating layer 32 need not be water soluble as long as it disperses sufficiently to release the contents of the bag or container after the continuous layer dissolves or disperses. A roll 20 of multi-layer, water-soluble film 24 is unrolled and enters packaging machine 22 which in this case is a vertical form, fill and seal machine. It is to be understood that any apparatus or device suitable for forming a bag or container, filling it with the desired material and sealing the bag or container with the material contained therein can be utilized. Any suitable type of packaging equipment and/or forming, filling and sealing methods can be used in accordance with the invention. Packaging machine 22 operates automatically and continuously, forming, filling and sealing water-soluble film 24 to produce water-soluble packages or containers 28. The length of film required per package through packaging machine 22, which relates to the finished bag length, can be set to precisely match the machine direction dimension of the individual uncoated areas on film 24. Packaging machine 22 is not shown or described in detail, since suitable packaging machines of various types, including vertical form, fill and seal machines, are well known in the art. Any of a variety of water-soluble materials, such as polyvinyl alcohol or methylhydroxypropyl cellulose, can be accepted by packaging machine 22 in its operation.

Packaging machine 22 has a loading section (not shown) for accepting the web of multi-layer, water-soluble film 24. A "web" is an elongated strip of thin, flexible film, which may come from a roll, for example. Film 24 is then formed into the shape of a package, preferably with use of a sensor 23 to detect registration marks on the film to ensure that the film sheets are in proper registry for seal formation along uncoated areas 34 as hereinafter illustrated and described. Package 28 is filled with the material to be contained (not shown). The package opening is then heat sealed, and the film web is cut to form a leak-proof, water-soluble container 28. Packaging machine 22 is generally of conventional design. Sensor 23 provides a signal to machine 22 sensing the location of film registration marks which are related to the locations of uncoated areas 34 that need to be in registration with the formation of the container seals in order to ensure that uncoated areas 34 are utilized to form the container seals. If improper registration is detected, an abort signal is generated to stop machine 22 and permit adjustment to obtain the proper registration. Adjustment may be done manually or automatically, such as by advancing film 24 until sensor 23 provides an indication of proper registration.

Figure 2:
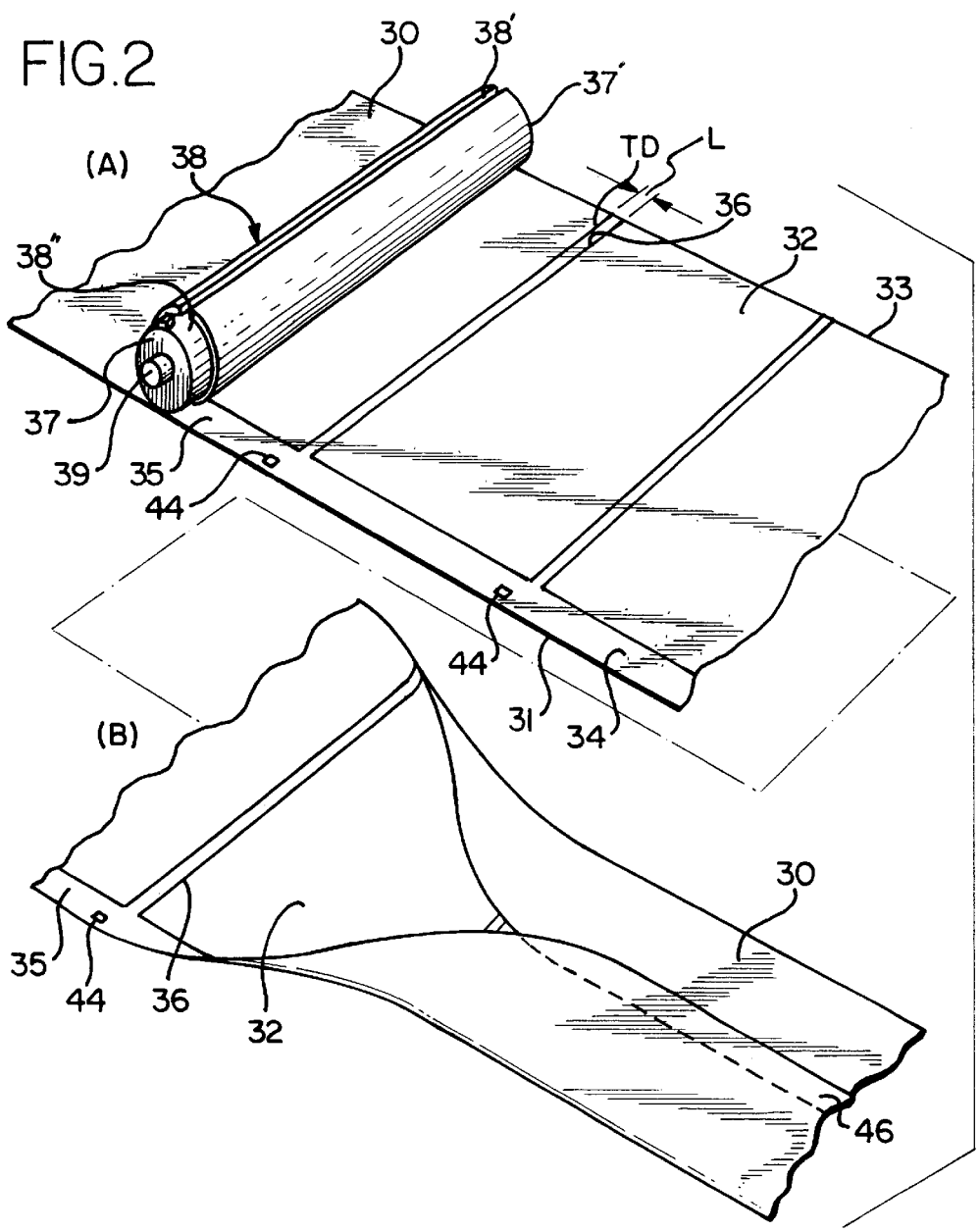
FIGS. 2A,B are perspective views of the multi-layer water-soluble film.
FIG. 2B shows the longitudinal edges of the water-soluble film being joined together to form a package.

FIG. 2 is a perspective view of multi-layer, water-soluble film 24 that is suitable for construction into water-soluble bag 28, and FIGS. 3–5 show bag 28 constructed from multi-layer film 24. A detailed disclosure is not provided of the equipment for making bag 28, as the equipment for making bag 28 is well known to those skilled in the art.

As shown in FIG. 2A, a continuous layer 30 of cold water-soluble or dispersible material is intermittently coated with a barrier coating 32, leaving a plurality of uncoated areas 34 of the continuous layer 30 which define the seal-forming areas when the film is constructed into bag 28.

Regardless of the type of packaging machine that is utilized, the seal(s) should be made from uncoated areas of the film. The uncoated areas should be in appropriate locations on the film, and of sufficient size to enable the seal(s) to be so formed. Typically, depending on the type of forming, filling and sealing machines used, uncoated areas 34 include (1) uncoated areas 36 that are spaced apart longitudinally at repeating distances in transverse locations across continuous layer 30 and (2) an uncoated area 35 that occurs along at least one longitudinal edge (in this case edge 31) of continuous layer 30. Typically, depending on the type of sealing machine and the seal width, the transverse uncoated areas 36 are from about 3 to 10 mm wide, and the longitudinal uncoated areas are from about 5 to 20 mm wide. The distance between transverse uncoated areas 36 depends on the desired length of the bag. Continuous layer 30 is suitable for forming the exterior layer of the bag for containing chemicals, as it has sufficient thickness and strength. Barrier coating 32, suitable for forming the interior layer of the bag, is less reactive than continuous layer 30 with respect to the substance to be packaged. Preferably, barrier layer 32 prevents, mitigates, or otherwise reduces the interaction between continuous layer 30 and the contents of the bag made from multi-layer film 24. Barrier coating 32 also lacks sufficient structural integrity or strength to contain the contents of bag 28 once continuous layer 30 is substantially dissolved or dispersed. Barrier coating 32 may be colored and visible to the eye and, in an alternative embodiment, may be clear and relatively invisible. Preferably, film 24 includes a registration mark 44 or other indicia to permit identification of locations of uncoated areas 34 such as by sensing apparatus 23 so that such areas may be registered prior to sealing the edges of the bag. Registration mark 44 is preferably a visually detectable mark, and may be a square dot approximately 5 mm×5 mm or some other shape and size as desired. Usually, registration mark 44 is positioned on an uncoated longitudinal area 35 for subsequent detection by a sensor, such as a photoelectric device, during construction of film 24 into bag 28. In the alternative, when barrier coating 32 is colored or otherwise visually detectable by a person, registration can be made manually at start-up or during operation of packaging machines that permit manual registration. In another embodiment, registration mark 44 is disposed on barrier coating 32.

FIG. 2B shows that in construction of film 24 into bag 28, the longitudinal edges 31, 33 are adjoined together. For a typical vertical form, fill and seal machine, one uncoated longitudinal edge 31 adjacent barrier coating 32 is folded over so it becomes adhered to the opposite 30 longitudinal edge 33 on the side of continuous layer 30 that forms the exterior of bag 28. This, in effect, forms a lap seal 46. Preferably, for forming horizontal seals 47, the sealing jaws of packaging machine 22 have a larger width than that of the uncoated transverse areas 36 of multi-layer, water-soluble film 24, in order to eliminate any portion of uncoated areas 36 from being exposed to the material being packaged after the package has been filled and sealed.

FIG. 12, which is not to scale, illustrates schematically sealing jaws 29a and 29b of machine 22, which include a jaw knife 29' to separate bag 28 from bag 28'. Jaws 29a and 29b are movable towards and away from film 24 in the directions indicated by arrows A and A'. Jaws 29a and 29b are slightly wider (distance D in FIG. 12) in the machine direction MD than the width L of uncoated areas 36 as shown in FIGS. 2 and 12, by a distance of D-L, where D is the width of jaws 29a and 29b and L is the width of uncoated areas 36. Thus, for each bag, at least a slight overlap may be provided, if desired, such that the amount of overlap at horizontal seal 47 of jaws 29a and 29b is a distance ½ (D-L) past the transverse boundary TB separating uncoated area 36 from coated area 32 for bags 28 and 28' as shown in FIG. 12.

In this manner, it is ensured that no portion of uncoated areas 36 is exposed to material 45 contained within bags 28 and 28'. Generally, a seal will not be formed between coated areas 32.

Generally, continuous layer 30 of multi-layer, water-soluble film 24 is sufficiently thick to provide the necessary structural strength for use as a bag to contain the desired chemical. Depending on the type of cold water-soluble film, continuous layer 30 typically has a thickness in the range of from about 10 to about 500 microns or greater, for example, and more typically in the range of from about 20 to about 75 microns. The actual thickness will depend on the particular application, including the type of water-soluble material, the dimensions of the bag, and the density and amount of material to be stored therein and the material being packaged.

In accordance with one aspect of the present invention, the film material that is generally the structural, or part of the structural, portion of a bag or container protected from being attacked or adversely affected by the material contained therein by use of an intermittent barrier material on the area of film that forms the bag or container interior. Generally, when film 24 is formed into a bag to contain a material that may attack or deleteriously affect continuous, cold-water soluble layer 30, barrier coating 32 is in contact with the chemical and prevents the chemical from contacting continuous layer 30. In this manner, barrier coating 32 is impervious or resistant to the chemical contained in the bag. Thus, it is important that barrier coating 32 be continuous or at least substantially continuous with continuous layer 30 in areas that will form the interior of a bag or other container.

FIGS. 6–7, respectively, show a cross-sectional view of a filled bag containing a material or chemical composition 45 and constructed from multi-layer film 24. Barrier coating 32 is generally thinner than continuous layer 30, typically in the range of from about 0.25 microns to about 25 microns or more and, more typically, from about 0.25 microns to about 10 microns and preferably from about 0.5 to about 5 microns.

In accordance with another embodiment of the invention, continuous water-soluble layer 30 comprises multiple layers of water-soluble film. Continuous layer 30 may be made from a single layer or from multiple layers of the same or different film type such as co-extruded or tri-extruded cold water-soluble films, as they are known in the art. Generally, continuous water-soluble layer 30 has a thickness relative to the barrier layer of about 500:1 to about 2:1, preferably about 400:1 to about 3:1 and most preferably about 60:1 to about 5:1. Preferably, continuous layer 30 has a thickness in the range of from about 20 microns to about 75 microns.

Many types of water-soluble films are suitable for continuous layer 30 of multi-layer film 24. For example, suitable water-soluble films include polyvinyl alcohol, polyoxyethylene, cellulose derivatives such as methylcellulose, methylhydroxyethyl cellulose, methylhydroxypropyl cellulose, hydroxypropyl cellulose, cellulose monoacetate, hydrophobically modified cellulose derivatives, sodium polyacrylate, polylactic acid, lactic acid ethers or esters of polyvinyl alcohol, lactic acid ethers or esters of cellulose derivatives, and lactic acid grafts on polyvinyl alcohol, carrageenan, pectin, and combinations of the foregoing and combinations of the foregoing and starch. For example, suitable hydrophobically modified cellulose derivatives include C-16 modified hydroxyethyl cellulose, methylhydroxypropyl cellulose, and hydroxypropyl cellulose. All of the foregoing materials can be cold water soluble.

Generally, the water soluble polymer used for continuous layer 30 will be plasticized in order to provide suitable flexibility and other physical properties, such as tensile modulus, impact strength and tear strength, for example. Suitable plasticizers may include materials such as glycerin, triethylene glycol, propylene glycol and polyethylene glycols, for example.

Starch may be added and used in combination with the foregoing water-soluble materials to make continuous layer 30. For example, suitable starches include unmodified or modified corn, potato, rice and wheat starches.

In accordance with the principles of the invention, barrier coating 32, chemically differentiated from continuous layer 30, can be one of the following: (1) cold water soluble but less reactive or susceptible to interaction with the agrichemical (or other material to be packaged) than the continuous layer, (2) hot water soluble, or (3) dispersible. Barrier coating 32 must have good adhesion properties to, and otherwise be compatible with, continuous layer 30; it must also be chemically and physically compatible with the material to be stored in the resulting container made from film 24 that is, neither the material to be stored nor the barrier material is adversely affected to an unacceptable degree.

In one embodiment, barrier coating 32 is a polymer that does not dissolve in water at temperatures above 50° C. Suitable polymers can be selected from cellulose derivatives in which the degree of substitution is sufficient to prevent solubility above 50° C. such as, for example, cellulose acetate lactate, cellulose lactate, methylhydroxybutyl cellulose, hydrophobically modified cellulose derivatives, and combinations thereof.

In accordance with another embodiment, barrier coating 32 is a polymeric layer that does not dissolve in water at temperatures below about 50° C. Suitable materials for this embodiment include polyvinyl alcohol that does not dissolve in water at temperatures below 50° C., including between 97% and 99.99% hydrolyzed polyvinyl alcohol. Generally, hot water-soluble films will be utilized as a thin layer, usually from about 0.25 to about 15 microns thick, so that the barrier coating disintegrates once the outer, cold water-soluble, continuous layer dissolves.

In yet another embodiment, barrier coating 32 can be a polymeric film that dissolves in water but is less, or substantially less, reactive than the material comprising continuous layer 30 to the chemical contained in bag 28. Such barrier coating 32 is not suitable for aqueous solutions containing free water. Generally, such barrier layer 32 is suitable for packaging organic solvent-based materials and solids.

Barrier coating 32 can be selected from a cold water-soluble material when it is less susceptible than the continuous layer to interaction with the chemical to be packaged. For example, when continuous layer 30 is cold water-soluble polyvinyl alcohol, suitable cold water-soluble materials—depending on the material to be packaged—include cellulose derivatives having a degree of substitution or moles of substitution that provide solubility in water in the range of from about 5° C. to about 60° C. or greater, such as methyl cellulose, methylhydroxyethyl cellulose, methylhydroxypropyl cellulose, methylethyl cellulose, methylhydroxybutyl cellulose, hydroxypropyl cellulose, carboxymethyl cellulose, hydrophobically modified cellulose derivatives, cellulose monoacetate, cellulose acetate lactate, cellulose lactate, karaya gum, guar gum, carrageenan, pectin, gum tragacanth, sodium alginate, gum arabic, xanthan gum, sodium acrylate, and ammonium acrylate.

In another embodiment in accordance with the principles of the present invention, barrier coating 32 can be selected so as to disperse or disintegrate in water, provided it exhibits the proper resistance and other properties with respect to the chemical to be contained in bag 28. Suitable materials for barrier coating 32 include acrylic acid polymers, acrylic ester polymers, acrylic acid copolymers, acrylic ester copolymers, copolymers of acrylic acids and esters, crosslinked polyvinyl alcohols, crosslinked cellulose derivatives, ethyl cellulose, nitrocellulose, cellulose butyrate, cellulose acetate butyrate, ethylene vinyl alcohol, ethylene vinyl acetate, polyvinyl acetate, polyvinylidene chloride, natural and synthetic waxes, polyurethanes and modified polyvinyl alcohols.

One preferred barrier coating material is a blend of polyvinyl acetate and a natural wax. Other materials may be known to those skilled in the art for barrier coating 32.

In accordance with still another aspect of the present invention, a method is provided for making a water-soluble film 24 suitable for construction into bag 28 to contain substances that adversely affect the water-soluble film. The method includes providing a web of cold water-soluble film to form continuous layer 30 and intermittently adhering a layer of barrier coating 32 onto discrete areas of the continuous layer so as to leave a plurality of uncoated areas 34 on the continuous layer in accordance with the invention. FIG. 9 shows multi-layer, water-soluble film 24 having registration mark 44 and elliptical-shaped uncoated areas 34 of continuous layer 30 which, when sealed to a second sheet of film 24 having uncoated areas of the same shape, will give rise to an elliptical-shaped bag. In alternative embodiments, uncoated areas 34 can have other geometric shapes so as to produce a variety of bag shapes, including square, round, triangular, or octangular, as examples.

Referring to FIG. 11, there is illustrated a water soluble film 24' in accordance with the invention that is useful for use in a horizontal flow wrapper packaging machine. Film 24' is composed of continuous layer 30' and barrier coating layer 32' which can be similar to continuous layer 30 and barrier coating layer 32, and registration marks 44' respectively, as previously described. However, uncoated areas 34' include uncoated areas 35' along both longitudinal edges 31' and 33', and uncoated areas 36' that are longitudinally spaced apart at repeating distances along transverse areas across continuous layer 30'. The uncoated areas are of sufficient size to allow formation of suitable seals in those areas when a bag or package is made therefrom, with coated area 32' forming the interior of the bag or package.

Any suitable method of making multi-layer, water-soluble film 24 can be utilized. Barrier coating 32 can be applied in any suitable manner known to those skilled in the art and can be applied in suspension or solution form, for example.

Preferably, the barrier coating can be applied by various roll coating methods and printing processes, direct gravure coating and flexography being preferred, and direct flexogravure printing being particularly preferred. As illustrated in FIG. 2A, barrier coating 32 is roller-coated onto continuous layer 30. This method, illustrated in FIG. 2A, involves using a roller 37 to apply barrier coating 32 onto a web of continuous layer 30. The outer surface 37' of roller 37 is rotating at about the same speed as layer 30. Roller 37 has a depression or void area 38 including a trough 38' and a void area 38" at end 39. Trough 38' extends longitudinally across the surface of roller 37, and void area 38" extends around the perimeter of at least one end 39 of roller 37. Preferably, void area 38 is disposed along at least a portion of the surface and around at least a portion of the perimeter of at least one end of roller 37. Trough 38' also has an outer width that substantially corresponds to the desired width of uncoated area 36. Although trough 38' is preferably linear, as shown in FIG. 2A, it can be of virtually any desired shape—that is, circular, triangular, or rhomboidal, for example—to produce the desired shape of uncoated areas. Preferably, trough 38' is disposed at nearly a right angle to ends 39 of roller 37 but, alternatively, can be located at any angle to ends 39 to produce a desired shape for the uncoated regions. Void area 38" at end 39 of roller 37 has a width that substantially corresponds to the desired width of longitudinal uncoated area 35. As roller 37 rotates over continuous layer 30, it deposits material onto continuous layer 30 that will form barrier coating 32. No barrier coating material is deposited where void areas 38 pass over layer 30, thereby resulting in uncoated areas 34 including transverse uncoated areas 36 and longitudinal uncoated areas 35 on continuous layer 30.

FIG. 8 illustrates applying barrier coating 32 onto continuous layer 30 by printing. In this process, a web of continuous, water-soluble film 30 enters printer 26 which, in a printing operation, affixes barrier coating 32 and preferably registration mark 44 onto continuous film 30. As printing equipment is known to those in the art, a detailed disclosure is not provided herein.

FIG. 10 shows an additional method for applying barrier coating 32 to continuous layer 30. This method operates in a semi-continuous manner and utilizes a spray-mask device 40 located along web 30' of water-soluble film 30. Spray mask device 40 includes a stationary mask 41 that screens the portion of film 30 that will form uncoated areas 35 and 36 and intermittently sprays barrier coating material from hood 40' through a plurality of spray nozzles (not shown) contained therein onto the exposed portions of film 30 so as to form the aforedescribed, inventive, multi-layer film 24. In this embodiment, web 30' of film 30 stops intermittently for the spray operation to be performed. Stationary mask 41, positioned above film 30 and below the plurality of spray nozzles, covers selected portions of water-soluble film 30 to prevent barrier coating material from contacting these portions during the spray operation. Pump 42 pumps barrier coating material from tank 43 through lines 43a and 43b to the nozzles which spray the barrier coating material downwardly onto exposed portions of continuous film 30. The covered portions of continuous film 30 remain uncoated and form uncoated areas 35 and 36. Any barrier coating material that contacts mask 41 is returned to tank 43 via a return line 43'. The portion of film 30 that has been coated to produce multi-layer film 24 is then advanced out of spray-mask device 40, and an uncoated portion of web 30' of film 30 is moved into position for application of the barrier coating material. Web 30' can be conveyed continuously if a moving mask is utilized.

Other suitable techniques of fabricating multi-layer, water-soluble film 24 could also be utilized.

In accordance with another aspect of the present invention, water-soluble bag 28 is provided for containing a material, which may be an agrichemical or other chemical, the bag being particularly suitable for containing materials that substantially adversely affect water-soluble films. Bag 28, shown in FIG. 4, is composed of the aforedescribed multi-layer, water-soluble film 24 comprising an outer layer of cold water-soluble film 30 and an interior barrier coating 32 that is capable of preventing the agrichemical when stored therein from contacting cold water-soluble film layer 30. Bag 28 has lap seal 46 and horizontal seals 47. Lap seal 46 is formed from adhering uncoated area 35 to the opposite longitudinal edge 33 on the side of continuous layer 30 that forms the exterior of bag 28, and horizontal seals 47 are formed from transverse uncoated intervals 36. When bag 28 containing the agrichemical or other chemical is placed in water, outer water-soluble layer 30 dissolves and barrier coating 32, lacking sufficient structural integrity and strength to contain the agrichemical therein, dissolves or disperses into particles small enough to allow the agrichemical to disperse into the water.

In accordance with still another aspect of the present invention, a method is provided for packaging a chemical composition that chemically or physically reacts with a water-soluble film. The method includes forming a water-soluble package or bag from the inventive multi-layered film 24 in accordance with the present invention and comprising continuous layer of water-soluble film 30 and barrier coating 32 adhered to discrete areas of the outer layer. Preferably, uncoated area 35 on one longitudinal edge is affixed to the opposite longitudinal edge 33 on the side that forms the exterior of bag 28. The configuration of the bond so formed can, however, vary, depending on the distribution of and shape of uncoated areas 34. The bag-forming step preferably includes registering the uncoated intervals of the continuous layer which will form the sealing areas of the bag. The method also includes adding a desired amount of the chemical material to be contained in the package, and sealing multi-layer film 24 together along at least one uncoated interval 34 to form sealed package 28. The sealing step may be accomplished in any suitable manner, such as by heat, solution, adhesive, ultrasound, and electrical impulses, for example.

While the invention has been described with respect to certain preferred embodiments, it is to be understood that the invention is capable of numerous changes, modifications and rearrangements without departing from the scope or spirit of the invention as defined in the claims.

We claim:

1. A multi-layer film, suitable for construction into bags for containing solid or liquid substances that adversely affect one or more layers of said film comprising:

a structural layer of water-soluble film material suitable for forming an outer layer of the bag and having sufficient thickness to provide strength for use and handling when made into the bag to contain the substance; and a barrier layer, which is a film, suitable for forming an inner layer of the bag and affixed to spaced apart discrete areas of said structural layer, each of said discrete areas of sufficient size to form an interior surface of a bag without the structural layer forming an interior surface of the bag, said barrier layer lacking sufficient structural integrity and strength to contain the contents of the bag once the structural layer is dissolved, said barrier layer being less reactive than said structural layer with the substance to be packaged, said spaced apart discrete areas being spaced from each other by an area of said water-soluble film material having no barrier layer thereon and being of sufficient size for forming a bag seal.

2. The multi-layer film of claim 1 further comprising indicia corresponding to said areas of said water-soluble film material having no barrier layer thereon.

3. The multi-layer film of claim 2 wherein said indicia comprises visually detectable marks disposed at repeating distances on one of said layers.

4. The multi-layer film of claim 1 wherein said structural layer comprises multiple layers of water-soluble film.

5. The multi-layer film of claim 1 wherein said multi-layer film has transverse and longitudinal directions and said barrier layer free areas occur at repeating distances in transverse locations across said structural layer and along at least one longitudinal edge of said structural layer.

6. The multi-layer film of claim 1 wherein said structural layer has a thickness relative to said barrier layer of about 500:1 to about 2:1.

7. The multi-layer film of claim 6 wherein the thickness of said structural layer is in the range of between about 12 microns and about 200 microns.

8. The multi-layer film of claim 1 wherein said barrier layer has a thickness in the range of between about 0.025 microns and about 25 microns.

9. The multi-layer film of claim 1 wherein said barrier layer comprises a polymeric material that does not dissolve in water at temperatures above 5° C.

10. The multi-layer film of claim 1 wherein said barrier layer material is selected from the group consisting of cellulose acetate lactate, cellulose lactate, methylhydroxybutyl cellulose, hydrophobically modified cellulose derivatives, acrylic acid polymers, acrylic ester polymers, soluble acrylic acid copolymers, soluble acrylic ester copolymers, soluble copolymers of acrylic acids and esters, polyvinyl alcohols, crosslinked polyvinyl alcohols, crosslinked cellulose acetate butyrate, ethylene vinyl alcohol, ethylene vinyl acetate, polyvinlidene chloride, natural and synthetic waxes, polyurethanes, modified polyvinyl alcohols, and combinations thereof.

11. The multi-layer film of claim 1 wherein said barrier layer does not dissolve in water at temperatures below 50° C.

12. The multi-layer film of claim 11 wherein said barrier layer is about 0.25 microns to about 15 microns thick.

13. The multi-layer film of claim 1 wherein said structural layer is selected from the group consisting of methylcellulose, methylhydroxyethyl cellulose, methylhydroxypropyl cellulose, hydroxypropyl cellulose, cellulose, cellulose monoacetate, hydrophobically modified cellulose derivatives, sodium polyacrylate, polylactice acid, lactic acid ethers, cellulose esters, polyvinyl alcohol, carrageenan, pectin, starches, and combinations thereof.

14. The film of claim 2 wherein the indicia is machine readable.

15. A method of making a multi-layer film suitable for construction into a bag to contain a substance that adversely affects at least one layer of said film, comprising the steps of:
(a) providing a web of water-soluble film to form a structural layer, said structural layer having sufficient thickness to provide strength for use and handling as a bag to contain the substance; and
(b) intermittently applying a film of a barrier material to form a barrier layer on discrete spaced apart areas of said structural layer to define a plurality of areas having no barrier forming material at repeating intervals on said structural layer, said barrier forming material being less susceptible than said structural layer to interaction with the substance.

16. The method of claim 15 wherein the step of applying a film of a barrier material to form a barrier layer further comprises using a roll coating process.

17. The method of claim 15 or 16 further comprising the step of placing a registration mark on one of said layers for subsequently forming a seal on the bag.

18. The method of claim 16 wherein the step of applying a film of a barrier material to form a barrier layer further comprises using a direct gravure coating process.

19. The method of claim 15 wherein the step of applying a film of a barrier material to form a barrier layer further comprises using a flexography process.

20. The method of claim 15 wherein the step of applying a film of a barrier material to form a barrier layer further comprises using a direct flexogravure printing process.

21. The method of claim 15 wherein the step of applying a film of a barrier material to form a barrier layer further comprises using a spray and mask device.

22. The method of claim 15 wherein the step of intermittently applying a film of a barrier material to form a barrier layer further comprises adhering said film to spaced apart discrete areas of sufficient size to form an interior surface of a bag without the structural layer forming an interior surface of the bag, said spaced apart discrete areas being spaced from each other by an area of said water-soluble film material having no barrier layer thereon and being of sufficient size for forming a bag seal.

23. A sealed bag for containing a chemical substance that substantially deleteriously affects water-soluble film, said bag comprising:
a structural layer of a water-soluble film having sufficient thickness to provide structural strength for use as a bag to contain the substance;
an inner barrier layer, which is a film, adhered directly to the structural layer forming the entire interior surface of the bag, said barrier layer lacking sufficient structural integrity to contain the content of the bag when the structural layer is dissolved, said barrier layer being less reactive than said structural layer with the substance contained therein;
and wherein the bag is formed by sealing together overlapping portions of the structural layer of the water-soluble film, which do not have the inner barrier layer, covering an extent of the overlapping portion.

24. The bag of claim 23 wherein said structural layer comprises multiple layers of water-soluble film.

25. The bag of claim 23 wherein said barrier layer material is selected from the group consisting of cellulose acetate lactate, cellulose lactate, methylhydroxybutyl cellulose, hydrophobically modified cellulose derivatives, acrylic acid polymers, acrylic ester polymers, soluble acrylic acid copolymers, soluble acrylic ester copolymers, soluble copolymers of acrylic acids and esters, crosslinked polyvinyl alcohols, crosslinked cellulose acetate butyrate, ethylene vinyl alcohol, ethylene vinyl acetate, polyvinlidene chloride, natural and synthetic waxes, polyurethanes, modified polyvinyl alcohols, and combinations thereof.

26. The bag of claim 23 wherein said structural layer material is selected from the group consisting of methylcellulose, methylhydroxyethyl cellulose, methylhydroxypropyl cellulose, hydroxypropyl cellulose, cellulose, cellulose monoacetate, hydrophobically modified cellulose derivatives, sodium polyacrylate, polylactice acid, polyvinyl alcohol, lactic acid ethers, cellulose esters, carrageenan, pectin, starches, and combinations thereof.

27. A multi-layer film, suitable for construction into bags for containing solid or liquid substances that adversely affect one or more layers of said film comprising:
a structural layer of water-soluble film material suitable for forming an outer layer of the bag having sufficient thickness to provide structural strength for use and handling when made into the bag to contain the substance;
a barrier layer suitable for forming an inner layer of the bag and affixed to a plurality of spaced apart discrete areas of said continuous layer, each of said discrete areas of sufficient size to form an interior surface of the bag without the structural layer forming an interior surface of the bag, said:barrier layer lacking sufficient strength to contain the contents of the bag once the structural layer is dissolved, said barrier layer being less reactive than said structural layer with the substance to be packaged, said spaced apart discrete areas being spaced apart from each other by an area of said water-soluble film material having no barrier coating and being of sufficient size for forming a bag seal; and wherein said barrier layer is selected from the group consisting of cellulose acetate lactate, cellulose lactate, methylhydroxybutyl cellulose, hydrophobically modified cellulose derivatives, acrylic acid polymers, acrylic ester polymers, soluble acrylic acid copolymers, soluble acrylic ester copolymers, soluble copolymers of acrylic acids and esters, crosslinked polyvinyl alcohols, crosslinked cellulose acetate butyrate, ethylene vinyl alcohol, ethylene vinyl acetate, polyvinlidene chloride, natural and synthetic waxes, polyurethanes and modified polyvinyl alcohols.

28. The multi-layer film of claim 27 further comprising indicia corresponding to said areas of said water-soluble film material having barrier layer thereon.

29. The multi-layer film of claim 28 wherein said indicia comprises visually detectable marks disposed at repeating distances on one of said layers.

30. The multi-layer film of claim 27 wherein said structural layer comprises multiple layers of water-soluble film.

31. The multi-layer film of claim 27 wherein said film has transverse and longitudinal directions and said barrier layer free areas occur at repeating distance in transverse locations across said structural layer and along at least one longitudinal edge of said structural layer.

32. The multi-layer film of claim 27 wherein said structural layer has a thickness relative to said barrier layer of about 500:1 to about 2:1.

33. The multi-layer film of claim 27 wherein the thickness of said structural layer is in the range of between about 12 microns and about 200 microns.

34. The multi-layer film of claim 27 wherein said barrier layer has a thickness in the range of between about 0.025 microns and about 25 microns.

35. The multi-layer film of claim 27 wherein said barrier layer comprises a polymeric material that does not dissolve in water at temperatures above 5° C.

36. The multi-layer film of claim 27 wherein said barrier layer does not dissolve in water at temperatures below 50° C.

37. The multi-layer film of claim 27 wherein when the film is made into a bag containing a liquid wherein the structural layer is the outer layer of the bag, the structural layer dissolves when the bag is placed in an aqueous medium, and the barrier layer does not dissolve.

38. The multi-layer film of claim 27 wherein said structural layer is selected from the group consisting of methylcellulose, methylhydroxyethyl cellulose, methylhydroxypropyl cellulose, hydroxypropyl cellulose, cellulose, cellulose monoacetate, hydrophobically modified cellulose derivatives, sodium polyacrylate, polylactice acid, lactic acid ethers, cellulose esters, polyvinyl alcohol,carrageenan, pectin, starches, and combinations thereof.

\* \* \* \* \*